(12) United States Patent
Hartman et al.

(10) Patent No.: US 10,752,188 B2
(45) Date of Patent: Aug. 25, 2020

(54) SYSTEM AND METHOD FOR REDUCING FUEL CONSUMPTION OF A WORK VEHICLE BASED ON ESTIMATED FAN-BASED AND/OR ALTERNATOR-BASED POWER LOSSES

(71) Applicant: CNH Industrial America, LLC, New Holland, PA (US)

(72) Inventors: Brian A. Hartman, Valparaiso, IN (US); Rowland J. Milburn, Jr., Naperville, IL (US); Rajeshwar Adupala, Naperville, IL (US); Shreedhra Bindingnavle, Burr Ridge, IL (US); Ashraf Omran, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 314 days.

(21) Appl. No.: 15/857,914

(22) Filed: Dec. 29, 2017

(65) Prior Publication Data
US 2019/0202378 A1    Jul. 4, 2019

(51) Int. Cl.
*B60R 16/023* (2006.01)
*B60W 10/06* (2006.01)
(Continued)

(52) U.S. Cl.
CPC ......... *B60R 16/0236* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS

| 4,594,666 A | 6/1986 | Cornell |
| 5,342,258 A | 8/1994 | Egyed |

(Continued)

FOREIGN PATENT DOCUMENTS

| GB | 2506379 | 4/2014 |
| WO | WO 2017/024217 | 2/2017 |

OTHER PUBLICATIONS

Oglieve et al. "Optimisation of the Vehicle Transmission and the Gear-Shifting Strategy for the Minimum Fuel Consumption and the Minimum Nitrogen Oxide Emissions.".

*Primary Examiner* — Jonathan M Dager
*Assistant Examiner* — Garrett F Evans
(74) *Attorney, Agent, or Firm* — Rickard K. DeMille; Rebecca L. Henkel

(57) ABSTRACT

In one aspect, a system and method allow for various pairs of candidate gear ratios and engine speeds to be identified for achieving a desired ground speed of a work vehicle. The individual operating efficiency of the vehicle's fan and/or alternator may then be analyzed for each pair of transmission/engine settings to estimate the associated parasitic power loss(es) for such component(s). Based on the parasitic power loss(es) determined for each transmission/engine setting, a net engine power or torque requirement can be calculated and used as an input for determining the fuel efficiency of the work vehicle at each candidate setting. The gear ratio and corresponding engine speed of the candidate setting associated with the lowest fuel consumption may then be set as the target or desired transmission/engine setting for maintaining the work vehicle at the desired ground speed.

18 Claims, 8 Drawing Sheets

(51) Int. Cl.
  *B60W 30/188* (2012.01)
  *B60W 10/11* (2012.01)
(52) U.S. Cl.
  CPC ... *B60W 30/1882* (2013.01); *B60W 2510/305* (2013.01); *B60W 2720/10* (2013.01)

(56) References Cited

U.S. PATENT DOCUMENTS

| | | |
|---|---|---|
| 6,546,329 B2 | 4/2003 | Bellinger |
| 8,845,485 B2 | 9/2014 | Smithson et al. |
| 9,043,061 B2 | 5/2015 | Sujan et al. |
| 9,074,684 B2 | 7/2015 | Yu et al. |
| 9,365,112 B2 | 6/2016 | Maruyama et al. |
| 9,410,618 B2 | 8/2016 | Seay et al. |
| 9,656,656 B2 | 5/2017 | Xing et al. |
| 2015/0330503 A1* | 11/2015 | Sujan .................. F16H 61/16 701/55 |
| 2016/0084374 A1 | 3/2016 | Kim |
| 2017/0120915 A1 | 5/2017 | David et al. |
| 2017/0159803 A1 | 6/2017 | Anderson et al. |

\* cited by examiner

SYSTEM AND METHOD FOR REDUCING FUEL CONSUMPTION OF A WORK VEHICLE BASED ON ESTIMATED FAN-BASED AND/OR ALTERNATOR-BASED POWER LOSSES

FIELD OF THE INVENTION

The present subject matter relates generally to systems and methods for reducing the fuel consumption of work vehicles and, more particularly, to a system and method for reducing the fuel consumption of a work vehicle based on estimated parasitic power losses of at least a fan and/or an alternator of the work vehicle while the vehicle is operating within an automatic efficiency or cruise control mode.

BACKGROUND OF THE INVENTION

Current work vehicles, such as tractors and other agricultural vehicles, include an electronically controlled engine and a transmission, such as a power shift transmission (PST) or a continuously variable transmission (CVT). In many instances, an operator may request that the engine and transmission of a work vehicle be automatically controlled via an associated vehicle controller to maintain the work vehicle at a given ground speed. In such instances, it is desirable to select the operational settings for the work vehicle in a manner that maximizes the vehicle's fuel efficiency. However, while the efficiency characteristics of conventional engines are relatively straight forward, the efficiencies of other power-consuming components of a work vehicle are typically complex and highly dynamic in nature. Thus, selecting the optimal operational settings in order to achieve the desired productivity while minimizing fuel consumption can be quite challenging.

In current control systems, algorithms have been developed that focus solely on the engine speed control strategy. For example, engine speed is typically controlled based on the vehicle loads, with the engine running at its most efficient settings when loads are relatively low. Unfortunately, such control algorithms fail to take into account the role that other power-consuming components play in impacting the overall efficiency of the vehicle.

Accordingly, a system and method for reducing the fuel consumption of a work vehicle based on estimated parasitic power losses of at least a fan and/or an alternator of the work vehicle while the vehicle is operating within an automatic efficiency mode would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing the fuel consumption of a work vehicle having an engine and a transmission coupled to the engine. The method may generally include receiving, with one or more computing devices, a speed command signal associated with a desired ground speed for the work vehicle and identifying, with the one or more computing devices, a plurality of unique candidate transmission/engine settings based on the desired ground speed, wherein each candidate transmission/engine setting includes a candidate gear ratio and a corresponding candidate engine speed for achieving the desired ground speed. In addition, the method may include estimating, with the one or more computing devices, an alternator power loss value associated with operation of an alternator of the work vehicle at each candidate transmission/engine setting and/or a fan power loss value associated with operation of a fan of the work vehicle at each candidate transmission/engine setting, and determining, with the one or more computing devices, a net engine power for each candidate transmission/engine setting that allows the desired ground speed to be achieved based at least in part on the alternator power loss value and/or the fan power loss value associated with each candidate transmission/engine setting. The method may also include analyzing, with the one or more computing devices, stored fuel efficiency data for the work vehicle based on the net engine power determined for each candidate transmission/engine setting to identify a target transmission/engine setting of the plurality of candidate transmission/engine settings that will minimize fuel consumption while achieving the desired ground speed. Moreover, the method may include controlling, with the one or more computing devices, the operation of the work vehicle such that a transmission ratio of the transmission and an engine speed of the engine correspond to the candidate gear ratio and the candidate engine speed, respectively, of the target transmission/engine setting.

In another aspect, the present subject matter is directed to a system for reducing the fuel consumption of a work vehicle. The system may generally include an engine, a transmission operatively coupled to the engine, and a controller configured to control the operation of the engine and the transmission. The controller may include a processor and associated memory. The memory may store instructions that, when executed by the processor, configure the controller to receive a speed command signal associated with a desired ground speed for the work vehicle, and identify a plurality of unique candidate transmission/engine settings based on the desired ground speed, with each candidate transmission/engine setting including a candidate gear ratio and a corresponding candidate engine speed for achieving the desired ground speed. In addition, the controller may be configured to estimate an alternator power loss value associated with operation of an alternator of the work vehicle at each candidate transmission/engine setting and/or a fan power loss value associated with operation of a fan of the work vehicle at each candidate transmission/engine setting, and determine a net engine power for each candidate transmission/engine setting that allows the desired ground speed to be achieved based at least in part on the alternator power loss value and/or the fan power loss value associated with each candidate transmission/engine setting. The controller may also be configured to analyze stored fuel efficiency data for the work vehicle based on the net engine power determined for each candidate transmission/engine setting to identify a target transmission/engine setting of the plurality of candidate transmission/engine settings that will minimize fuel consumption while achieving the desired ground speed. Moreover, the controller may be configured to control the operation of the work vehicle such that a transmission ratio of the transmission and an engine speed of the engine correspond to the candidate gear ratio and the candidate engine speed, respectively, of the target transmission/engine setting.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
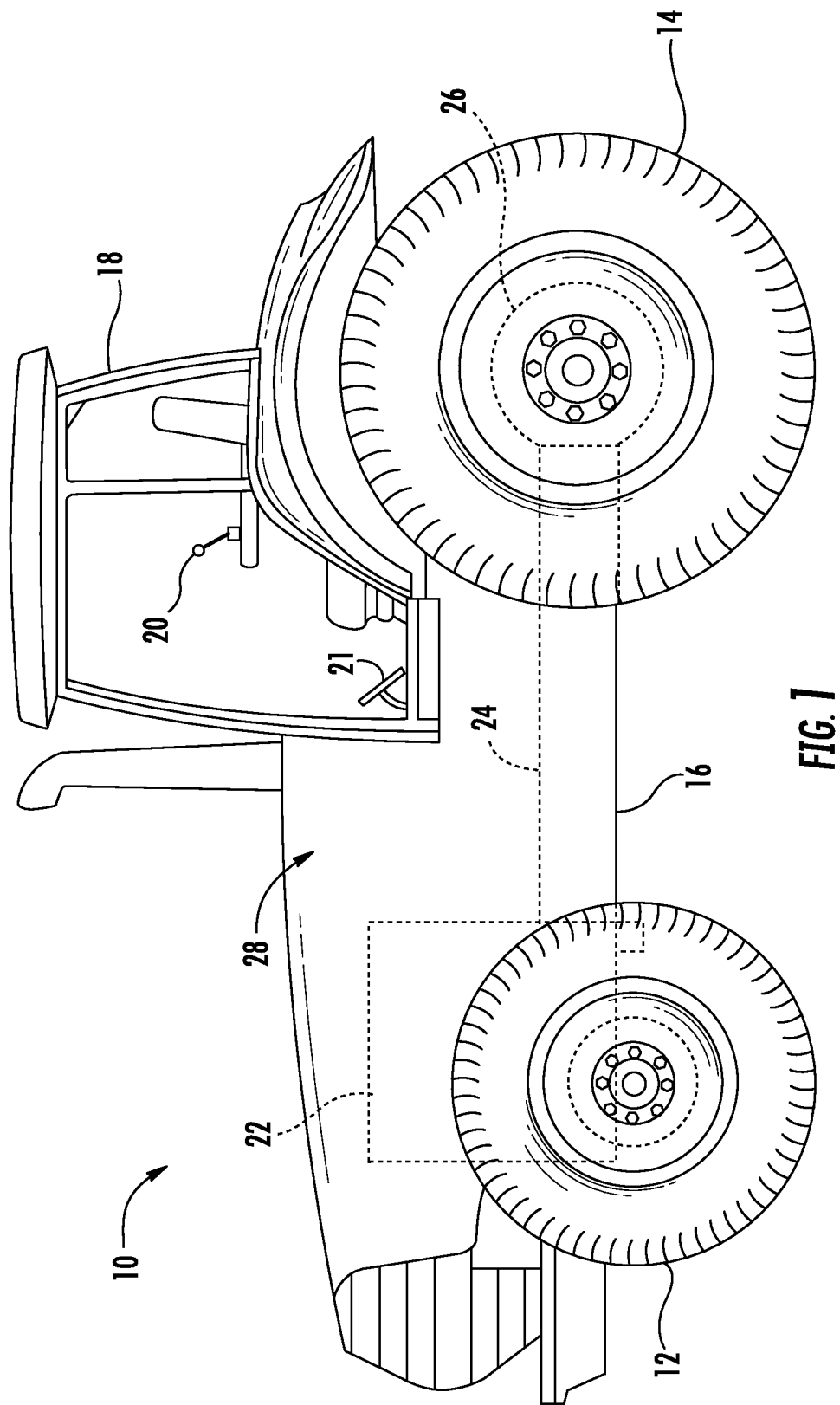
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for reducing the fuel consumption of a work vehicle. Specifically, the disclosed system and method may be utilized to minimize fuel consumption while maintaining the desired performance and productivity of the work vehicle. For example, in several embodiments, a controller of the work vehicle may receive a speed command input from the vehicle operator associated with a desired ground speed for the work vehicle. The controller may then identify suitable operating settings for the vehicle's transmission and engine based on the desired ground speed. For instance, a plurality of unique candidate transmission/engine settings may be identified by the controller, with each transmission/engine setting corresponding to a pair of operational settings including a candidate gear ratio for the transmission and a corresponding candidate engine speed for the engine that can be used to achieve the desired ground speed. Upon identification of the various candidate transmission/engine settings for achieving the desired speed, the controller may be configured to estimate a parasitic power loss value for each candidate setting that is associated with the consumed engine power of one or more power-consuming components of the work vehicle. For example, in one embodiment, the controller may estimate a parasitic power loss associated with each candidate transmission/engine setting that takes into account engine-related power losses, transmission-related power losses, fan power losses, alternator power losses, tire-related power losses, power take-off losses, and/or any other parasitic power losses associated with any power-consuming subsystems of the work vehicle. The estimated parasitic power loss value for each candidate setting may then be used to calculate the associated engine torque requirement for achieving the desired ground speed, which may then be used to determine which of the identified candidate settings results in the lowest fuel consumption while still allowing the desired ground speed to be maintained constant. The gear ratio and engine speed associated with the candidate transmission/engine setting having the lowest fuel consumption may then be set as the target gear ratio and engine speed for the work vehicle.

It should be appreciated that, in several embodiments of the present subject matter, the disclosed system and method may be implemented when the work vehicle is operating in an auto-efficiency or cruise control mode. For example, as indicated above, the operator may request that the work vehicle be maintained at a given ground speed. In such instance, the controller may be configured to control the operation of the vehicle's engine and/or transmission so as to maintain the work vehicle at the requested speed. In doing so, the present subject matter may be utilized to allow a gear ratio and associated engine speed to be selected by the controller that minimizes fuel consumption during operation within such auto-efficiency mode.

As will be described below, in several embodiments, the parasitic power loss value determined for each candidate transmission/engine setting may take into account the individual power loss values of any number of power-consuming components of a work vehicle. For instance, in one embodiment, the parasitic power loss value determined for each candidate transmission/engine setting may take into account the individual power loss values of each power-consuming component of the work vehicle. Alternatively, the parasitic power loss value determined for each candidate transmission/engine setting may only take into account the individual power loss value of a single power-consuming component of the work vehicle or the individual power loss values of a sub-set of the power-consuming components of the work vehicle. For example, in one embodiment, the parasitic power loss value for each candidate transmission/engine setting may be determined as a function of the fan-based power losses and/or the alternator-based power losses for the work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels and associated tires 12, a pair or rear wheels and associated tires 14, and a chassis 16 coupled to and supported by the wheels/tires 12, 14. An operator's cab 18 may be supported by a portion of the chassis 16 and may house various input devices, such as a control lever 20 and/or a foot pedal 21, for permitting an operator to control the operation of the work vehicle 10. As will be described below, one or more of the input devices may be used to allow the operator to provide a speed command to an associated controller of the work vehicle 10 that indicates a desired ground speed for the vehicle 10. Additionally, the work vehicle 10 may include an engine 22 and a transmission 24 mounted on the chassis 16. The transmission 24 may be operably coupled to the engine 22 and may provide variably adjustable gear ratios for transferring engine power to the wheels via a drive axle assembly 26. The engine 22, transmission 24, and drive axle assembly 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the wheels/tires 12, 14. Additionally, although not shown, the work vehicle 10 may also be configured to be operably coupled to any suitable type of work implement, such as a trailer, spray boom, manure tank, feed grinder, plow, seeder, planter, tillage implement, and/or the like.

Figure 2:
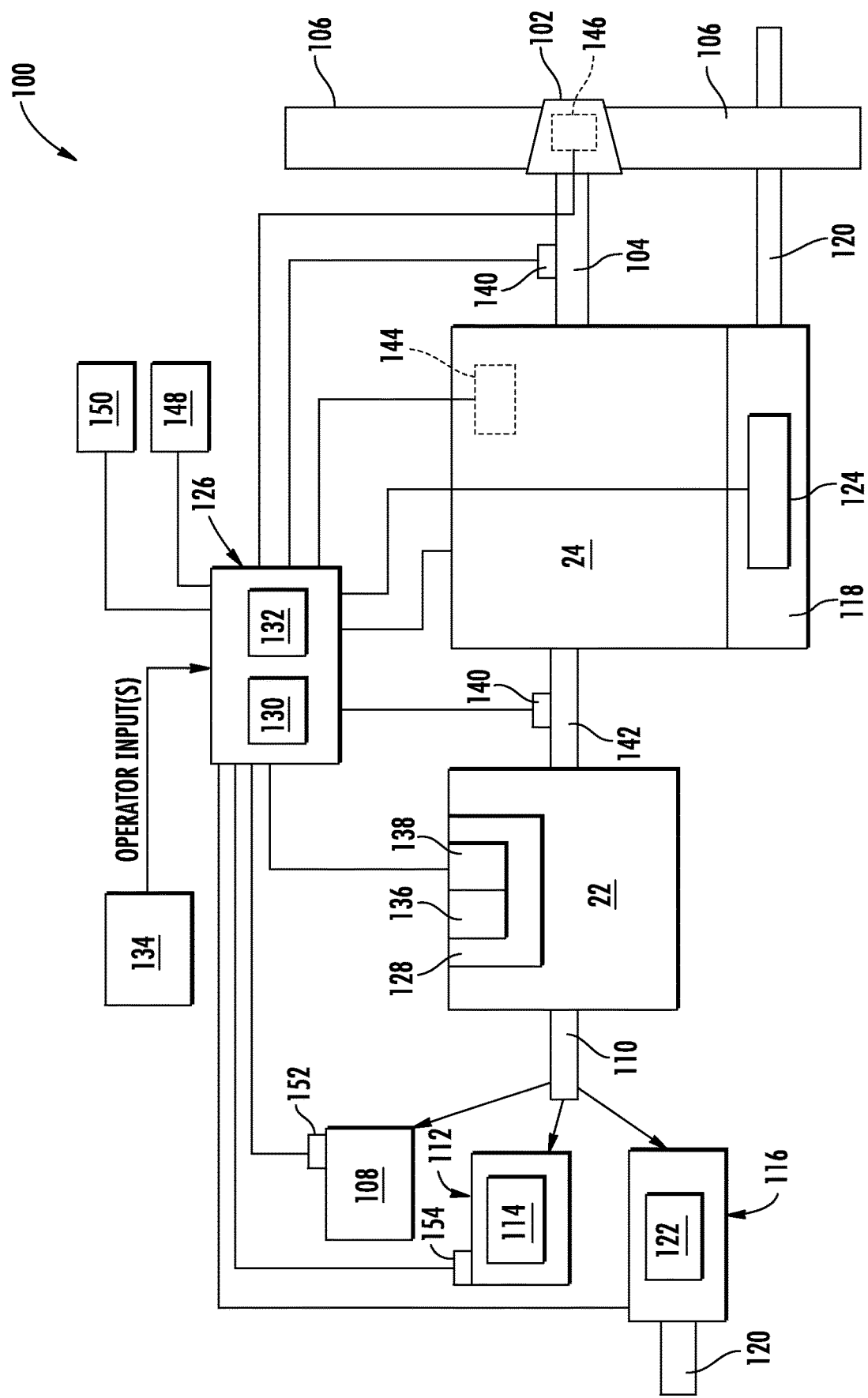
FIG. 2 illustrates a schematic view of one embodiment of a system for reducing the fuel consumption of a work vehicle in accordance with aspects of the present subject matter.

Referring now to FIG. 2, a schematic diagram of one embodiment of a system 100 for reducing the fuel consumption of a work vehicle 10 is illustrated in accordance with aspects of the present subject matter. As shown, the system 100 may include various drive train components of the work vehicle 10, such as the engine 22, the transmission 24 and the drive axle assembly 26. As is generally understood, the drive axle assembly 26 may include a differential 102 coupled to an output shaft 104 of the transmission 22 and one or more axle shafts 106 coupled to the differential 102 for transferring power to the drive wheels of the vehicle 10 (e.g., the rear wheels).

Additionally, the system 100 may include various other power-consuming components of the work vehicle 10. For example, as shown in FIG. 2, the system 100 may include an alternator 108 coupled to an output shaft(s) 110 of the engine 22 (shown schematically in FIG. 2 via the associated arrow) for generating an electrical power output used to power one or more components of the work vehicle 10. Moreover, as shown in FIG. 2, the system 100 may include a fan 112 coupled to the output shaft(s) 110 of the engine 22 (shown schematically in FIG. 2 via the associated arrow) for generating an airflow through a cooling system (not shown) of the work vehicle 10. In one embodiment, the fan 112 may correspond to a vistronic fan that utilizes a viscous clutch 114 to control the fan speed 112. For instance, an associated control valve (not shown) may be electronically controlled to regulate the supply of fluid to the viscous clutch 114, thereby modulating the degree of engagement of the clutch 114 so as to increase or decrease the resulting fan speed. For example, a maximum fan speed may be achieved when the clutch 114 is fully engaged, with lower fan speeds being achieved by controlling the amount of slip across the clutch 114.

Further, as shown in FIG. 2, the system 100 may also include one or more power take-offs (PTOs) 116, 118 configured to transfer power from the engine 22 to one or more implements via an associated PTO shaft(s) 120. For instance, in one embodiment, the system 100 may include a front PTO 116 configured to be selectively coupled to the output shaft(s) 110 of the engine 22 (shown schematically in FIG. 2 by the arrow) via an associated PTO clutch 122. Additionally, in one embodiment, the system 100 may also include a rear PTO 118 configured to be selectively coupled to the engine 22 via an associated PTO clutch 124. In such embodiments, when each PTO clutch 122, 124 is disengaged, the PTOs 116, 118 will not consume any mechanical power from the engine 22. However, by engaging one or both of the clutches 122, 124, power from the engine 22 may be transmitted through the PTO(s) 116, 118 to the associated shaft(s) 120 for rotationally driving an implement(s) coupled thereto.

As will be described below, the various drive train components and other power-consuming components of the work vehicle 10 may generally operate at different efficiencies, with each component consuming varying amounts of power at differing vehicle operating parameters. As such, the most efficient operating conditions for one component may result in decreased efficiency for one or more other vehicle components. For example, the efficiency of the transmission 24 may be relatively low when the engine settings (i.e., engine speed and engine torque) are selected to provide the most fuel efficient engine operation. Thus, in accordance with aspects of the present subject matter, the disclosed system 100 and method 200 (FIG. 3) may be utilized to enhance fuel efficiency and achieve performance/productivity requirements by taking into account the individual component efficiencies and associated parasitic power losses associated with the various power-consuming components of the work vehicle 10.

As shown in FIG. 2, the system 100 may also include a controller 126 configured to control the operation of one or more components of the work vehicle 10, such as the engine 22 and the transmission 24. For example, the controller 126 may be communicatively coupled to an engine governor 128 in order to control and/or monitor the speed and/or torque output of the engine 22. Similarly, the controller 126 may be coupled to various components of the transmission 22 (e.g., one or more transmission clutches, etc.) in order to adjust the gear ratio of the transmission 24 to control the output speed thereof.

It should be appreciated that the controller 126 may generally comprise any suitable processor-based device or combination of processor-based devices known in the art. Thus, in several embodiments, the controller 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 126 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 126 to perform various computer-implemented functions, such as the methods 200, 400 described below with reference to FIGS. 3 and 12. In addition, the controller 126 may also include various other suitable components, such as a communications circuit or module, one or more input/output channels, a data/control bus and/or the like.

It should also be appreciated that the controller 126 may correspond to an existing controller of the work vehicle 10 (e.g., an existing engine and/or transmission controller) or the controller 126 may correspond to a separate controller. For instance, in one embodiment, the controller 126 may form all or part of a separate plug-in module that may be installed within the work vehicle 10 to allow for the disclosed system and method to be implemented without requiring additional software to be uploaded onto existing control devices of the vehicle 10.

The system 100 may also include one or more input devices 134 communicatively coupled to the controller 126 to allow for operator inputs to be provided to the system 100. For example, in one embodiment, the work vehicle 10 may include an input device(s) 134 configured to permit an operator to input a speed command corresponding to a desired ground speed for the vehicle 10. Upon receipt of the speed command, the controller 126 may be configured to control the various components of the work vehicle 10 in order to achieve the commanded ground speed. For example, the controller 126 may be configured to regulate the engine speed and/or the gear ratio of the transmission 24 to adjust the speed of work vehicle 10 to the commanded ground speed. Moreover, in one embodiment, the input device(s) 132 may be utilized by the operator to instruct the controller 126 to execute an auto-efficiency mode. In such an embodiment, upon receipt of the commanded ground speed, the controller 126 may be configured to regulate the engine speed and/or the transmission ratio to maintain the desired ground speed as the work vehicle is traversed across a given surface, such as a field or a road.

Additionally, the system 100 may include one or more sensors for monitoring various operating parameters of the work vehicle 10. For example, as shown in FIG. 2, the controller 126 may be communicatively coupled to various sensors, such as a torque sensor 136 and/or a speed sensor 138, mounted on and/or within the engine 22 for monitoring the engine torque loads and/or the engine speed. In one embodiment, the sensor(s) 136, 138 may comprise an internal sensor of the engine governor 128. In another embodiment, the sensor(s) 136, 138 may comprise a separate sensor(s) configured to monitor the torque loads and/or the speed of the engine 22.

Moreover, the system 100 may also include one or more sensors 140 (e.g., shaft encoders, shaft sensors and/or any other suitable speed sensors) configured to monitor the rotational speeds of the various shafts of the transmission 24. For example, as shown in FIG. 2, the transmission 24 may include a speed sensor 140 mounted to and/or within the transmission input shaft 142 and/or the transmission output shaft 104 to measure the input and/or output speeds of the transmission 24. The speed sensors 140 may, in turn, be communicatively coupled to the controller 126 to permit the speed measurements to be transmitted to the controller 126 for subsequent processing and/or analysis. A temperature sensor 144 may also be provided to monitor the temperature of the hydraulic fluid being supplied to the transmission 24.

In addition, the system 100 may include various other sensors configured to monitor any other suitable operating parameters of the work vehicle 10. For example, in one embodiment, a sensor 146 may be associated with the drive axle assembly 26 for monitoring one or more operating parameters of the assembly 26, such as a torque load transmitted through the assembly 26, a rotational speed of one or more components of the assembly 26 and/or an axle temperature associated with the assembly 26. Moreover, the work vehicle 10 may include a vehicle speed sensor 148 (e.g., a GPS-based device) for monitoring the ground speed of the vehicle 10 and an inclination sensor 150 (e.g., an accelerometer) providing an indication of the slope or inclination of the surface across which the work vehicle is being traversed. Further, the work vehicle 10 may also include a sensor 152 for monitoring one or more operating parameters of the alternator 108, such as the alternator current and/or voltage, as well as a sensor 154 for monitoring one or more operating parameters of the fan 112, such as the fluid temperature within the fan 112.

As indicated above, the controller 126 may, in several embodiments, be configured to execute an auto-efficiency mode corresponding to a continuous wheel speed operational mode for the work vehicle 10. Specifically, the operator may be allowed to provide an input (e.g., via the input device(s) 134) requesting that the controller 126 enter the auto-efficiency mode. In doing so, the operator may be requested to input a desired ground speed for the work vehicle 10. In addition, the operator may also be requested to input a desired engine speed range during operation within the auto-efficiency mode, such as by requesting that the operator input maximum and minimum engine speed values for the desired range. Based on the desired ground speed requested by the operator, the controller 126 may be configured to calculate the associated transmission output speed for achieving the desired ground speed using the final drive gear ratio and the tire radius of the work vehicle 10. The controller 126 may then determine the requested engine speed using the following control low (Equation 1):

$$n_{re} = \frac{n_{do}}{G_r} \qquad (1)$$

wherein, $n_{re}$ corresponds to the requested engine speed, $n_{do}$ corresponds to the desired transmission output speed for achieving the commanded ground speed, and $G_r$ corresponds to the gear ratio of the transmission.

In one embodiment, when executing the control law of Equation 1, the controller 126 may be configured to use the current gear ratio of the transmission 24 (i.e., the gear ratio at the time the request is received to enter into the auto-efficiency mode) to initially calculate the requested engine speed. Upon calculation of the requested engine speed, the controller 126 may determine whether the requested engine speed falls within the engine speed range set by the operator. If the calculated engine speed for the current gear ratio falls within the desired engine speed range, the controller 126 may control the operation of the engine 22 to output the requested engine speed in order to initially achieve the desired ground speed requested by the operator. However, if the calculated engine speed for the current gear ratio falls outside the desired engine speed range, the controller 126 may be configured to select the closest gear ratio to the current gear ratio that is associated with a corresponding engine speed that falls within the desired engine speed range. For example, if the calculated engine speed for the current gear ratio is greater than the maximum engine speed set by the operator, the controller 126 may be configured to increase the gear ratio and reduce the engine speed (e.g., shift up-throttle back) until the engine speed calculated via Equation 1 is less than the maximum threshold. Similarly, if the calculated engine speed for the current gear ratio is less than the minimum engine speed set by the operator, the controller 126 may be configured to reduce the gear ratio and increase the engine speed (e.g., shift down-throttle up) until the engine speed calculated by Equation 1 is greater than the minimum threshold.

As will be described in greater detail below, upon identifying an initial gear ratio and associated engine speed for achieving the desired ground speed (e.g., the current gear ratio or the closest gear ratio that satisfies the engine speed limits), the controller 126 may then be configured to identify each pair of candidate transmission/engine operating settings that can potentially achieve the desired ground speed. For example, given the applicable engine speed limits, the controller 126 may identify each combination of a given gear ratio and associated engine speed that results in the desired ground speed being achieved. For instance, assuming that the operator requests a desired ground speed corresponding to a transmission output speed of 2000 RPM, the controller 126 may identify multiple candidate ratio/speed combinations for achieving the desired output speed. An example table showing various candidate ratio/speed pairs (e.g., five different combinations) that may be available for achieving a transmission output speed of 2000 RPM assuming a given transmission configuration is provided below:

TABLE 1

Example Candidate Transmission/Engine Settings for 2000 RPM Output Speed

| Transmission/Engine Setting Pairs | Gear | Engine Speed |
|---|---|---|
| Candidate Ratio/Speed Setting #1 | $5^{th}$ | 2200 RPM |
| Candidate Ratio/Speed Setting #2 | $6^{th}$ | 1900 RPM |
| Candidate Ratio/Speed Setting #3 | $7^{th}$ | 1650 RPM |
| Candidate Ratio/Speed Setting #4 | $8^{th}$ | 1320 RPM |
| Candidate Ratio/Speed Setting #5 | $9^{th}$ | 1100 RPM |

Upon identifying the applicable candidate transmission/engine settings, the controller 126 may be configured to estimate a parasitic power loss value for each candidate setting. Specifically, for each gear ratio and associated engine speed for a given candidate setting, the controller 126 may, in several embodiments, estimate an overall parasitic power loss value associated with operating the work vehicle at the applicable candidate transmission/engine setting. The overall parasitic power loss for each candidate setting may then be used to calculate a net engine power or torque requirement for achieving the desired ground speed at the associated gear ratio and engine speed, which, in turn, can be analyzed in light of known fuel efficiency data for the work vehicle 10 to identify the specific ratio/speed pair that will minimize fuel consumption while maintaining operation of the work vehicle 10 at the desired ground speed.

Figure 3:
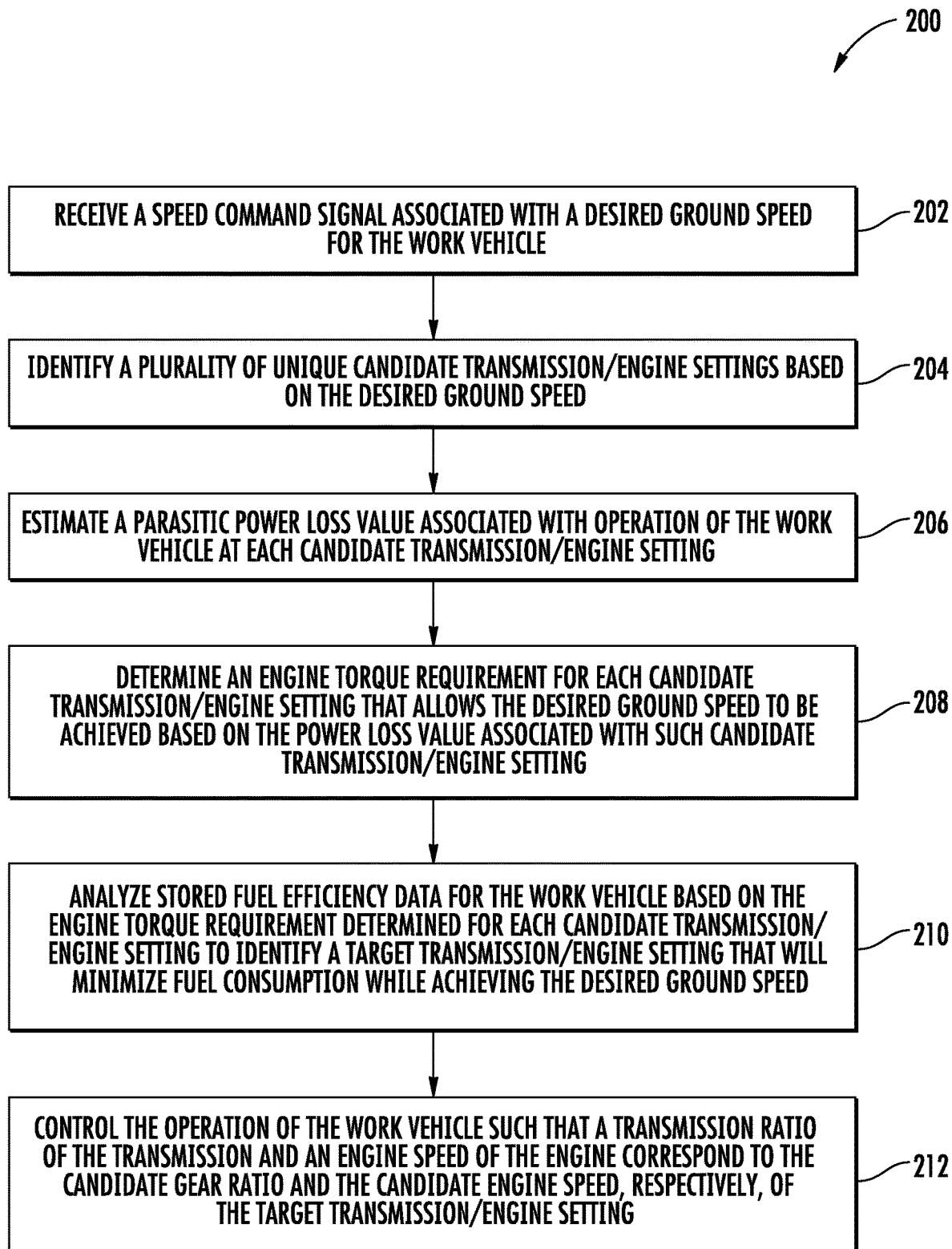
FIG. 3 illustrates a flow diagram of one embodiment of a method for reducing the fuel consumption of a work vehicle in accordance with aspects of the present subject matter.

Referring now to FIG. 3, a flow diagram of one embodiment of a method 200 for reducing the fuel consumption of a work vehicle 10 is illustrated in accordance with aspects of the present subject matter. The method 200 will generally be described herein with reference to the work vehicle 10 shown in FIG. 1 and the system 100 shown in FIG. 2. However, it should be appreciated by those of ordinary skill in the art that the disclosed method 200 may be implemented with any other suitable vehicles having any other suitable vehicle configuration and/or within any other suitable system having any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In general, the method 200 may allow for a work vehicle 10 to be controlled in a manner that minimizes fuel consumption while maintaining the desired vehicle performance/productivity. Specifically, in several embodiments, the method 200 may allow for various pairs of candidate gear ratios and engine speeds to be identified for achieving a desired ground speed of the work vehicle. The individual operating efficiencies of one or more of the power-consuming components of the work vehicle may then be analyzed for each pair of transmission/engine settings to estimate the associated parasitic power loss(es) within the system. Based on the parasitic power loss value determined for each transmission/engine setting, a net engine power or torque requirement can be calculated and used as an input for determining the fuel efficiency of the work vehicle at each candidate setting. The gear ratio and corresponding engine speed of the candidate setting associated with the lowest fuel consumption may then be set as the target or desired transmission/engine setting for maintaining the work vehicle at the desired ground speed.

As shown in FIG. 3, at (202), the method 200 may include receiving a speed command signal associated with a desired ground speed for the work vehicle. For instance, as indicated above, the work vehicle 10 may include one or more input devices 134 for allowing the operator to command or request a desired ground speed. The requested ground speed may then be transmitted to the controller 126 and used as an input for controlling the operation of the transmission 24 and/or the engine 22.

It should be appreciated that, in several embodiments, the controller 126 may be configured to receive the speed command signal in connection with a request to operate the work vehicle 10 within its auto-efficiency mode. In such embodiments, as indicated above, the controller 126 may be configured to initially select the closest gear ratio that allows for the operator-requested ground speed to be achieved given any applicable engine speed limits, which may correspond to the current gear ratio for the transmission 24 or may require that the transmission 24 be upshifted or downshifted in combination with an adjustment in the engine speed. Based on the selected gear ratio and associated engine speed, the controller 126 may then control the operation of the engine 22 and/or the transmission 24, as necessary, to adjust the vehicle's speed to the desired ground speed. Thereafter, the controller 126 may execute the remainder of the disclosed method 200 to minimize the vehicle's fuel consumption while ensuring that the work vehicle 10 is maintained at the desired ground speed.

Referring still to FIG. 3, at (204), the method 200 may include identifying a plurality of unique candidate transmission/engine settings based on the desired ground speed associated with the received speed command signal. Specifically, in several embodiments, each candidate transmission/engine setting identified by the controller 126 may include a candidate gear ratio and a corresponding candidate engine speed at which the desired ground speed may be achieved. Thus, for a given ground speed, a plurality of different combinations or pairs of gear ratios and associated engine speeds may be available for selection by the controller 126 (e.g., as shown in the example table above).

Additionally, at (206), the method 200 may include estimating a parasitic power loss value associated with operation of the work vehicle at each candidate transmission/engine setting. In one embodiment, the parasitic power loss associated with each candidate transmission/engine setting may be calculated as a function of the summation of all or a portion of the individual power losses of the various power-consuming components of the work vehicle 10. For instance, Equation 2 provides an example of various individual power losses that may be utilized to determine an overall parasitic power loss value for each candidate transmission/engine setting:

$$P_{loss} = PL_{engine} + PL_{trans} + PL_{fan} + PL_{alt} + PL_{tire} + PL_{PTO} + PL_{other} \quad (2)$$

wherein, $P_{loss}$ corresponds to the estimated overall parasitic power loss for the work vehicle 10 due to system inefficiencies, $PL_{engine}$ corresponds to the power loss associated with operation of the engine 22 (e.g., consumed engine friction losses), $PL_{trans}$ corresponds to the power loss associated with operation of the transmission 24, $PL_{fan}$ corresponds to the power loss associated with operation of the fan 112, $PL_{alt}$ corresponds to the power loss associated with operation of the alternator 108, $PL_{tire}$ corresponds the power loss associated with consumed tire power, $PL_{PTO}$ corresponds to the power loss associated with operation of the PTO(s) 116, 118, and $PL_{other}$ corresponds to the power loss associated with other power-consuming components of the work vehicle 10, such as the drive axle assembly, the air conditioning compressor, hydraulic subsystems, etc. The calculation of such individual power losses will be described in greater detail below.

It should be appreciated that Equation 2 simply provides one example of a mathematical formulation that may be used to calculate an associated parasitic power loss value for each candidate transmission/engine setting. However, in other embodiments, the parasitic power loss value for each candidate transmission/engine setting may be determined as a function of more or less power loss inputs. For instance, in one embodiment, the parasitic power loss value for each candidate transmission/engine setting may be calculated as a function of only a subset of the individual component loss values shown in Equation 2 or as a function of only a single individual component loss value.

It should also be appreciated that the controller 126 is configured to calculate a separate parasitic power loss value for each candidate transmission/engine setting. For example, the individual power losses for the various power-consuming components may be calculated assuming vehicle operation at the ratio/speed pair associated with each candidate transmission/engine setting. The individual power losses calculated for each candidate transmission/engine setting may then be input, for example, into Equation 2 to determine an overall parasitic power loss value for the associated candidate transmission/engine setting.

Moreover, at (208), the method 200 includes determining an engine torque requirement for each candidate transmission/engine setting that allows the desired ground speed to be achieved based on the power loss value associated with such candidate transmission/engine setting. Specifically, in several embodiments, the controller 126 may be configured to calculate the net engine power available for achieving the requested ground speed at each candidate transmission/engine setting as a function of the parasitic power loss value estimated for such candidate transmission/engine setting. As is generally understood, the net engine power available for satisfying the requested ground speed may generally be represented as a function of both the total available engine power and the associated parasitic power losses. For example, the power relationship for the work vehicle 10 can be expressed according to the following equation (Equation 3).

$$P_{net} = P_{engine} - P_{loss} \quad (3)$$

wherein, $P_{net}$ corresponds to the net engine power available to satisfy the vehicle's current speed requirement, $P_{engine}$ corresponds to the total available engine power, and $P_{loss}$ corresponds to the estimated parasitic power loss for the work vehicle due to system inefficiencies (e.g., as determined using Equation 2)

By calculating the net engine power available for each candidate transmission/engine setting, the controller 126 may then determine the associated engine torque requirement for achieving the desired ground speed at the ratio/engine pair associated with each candidate transmission/engine setting. For example, in one embodiment, the engine torque requirement for each candidate transmission/engine setting may be calculated according to the following equation (Equation 4):

$$T_i = \frac{P_{net(i)} * 5252}{n_{e(i)}} \quad (4)$$

wherein, $T_i$ corresponds to the torque power requirement (e.g., in ft-lbf) for the candidate transmission/engine setting (i), $P_{net(i)}$ corresponds to the net engine power (e.g., in HP) estimated for the candidate transmission/engine setting (i), and $n_{e(i)}$ corresponds to the candidate engine speed (e.g., in RPM) for candidate transmission/engine setting (i).

Referring still to FIG. 3, at (210), the method 200 may include analyzing stored fuel efficiency data for the work vehicle based on the engine torque requirement determined for each candidate transmission/engine setting to identify a target transmission/engine setting of the various candidate transmission/engine settings that will minimize fuel consumption while achieving the desired ground speed. Specifically, using the engine torque requirement determined for each candidate transmission/engine setting along with the candidate engine speed associated with such candidate setting, the controller 126 may be configured to determine the most fuel efficient candidate setting for achieving the ground speed requested by the operator.

Figure 4:
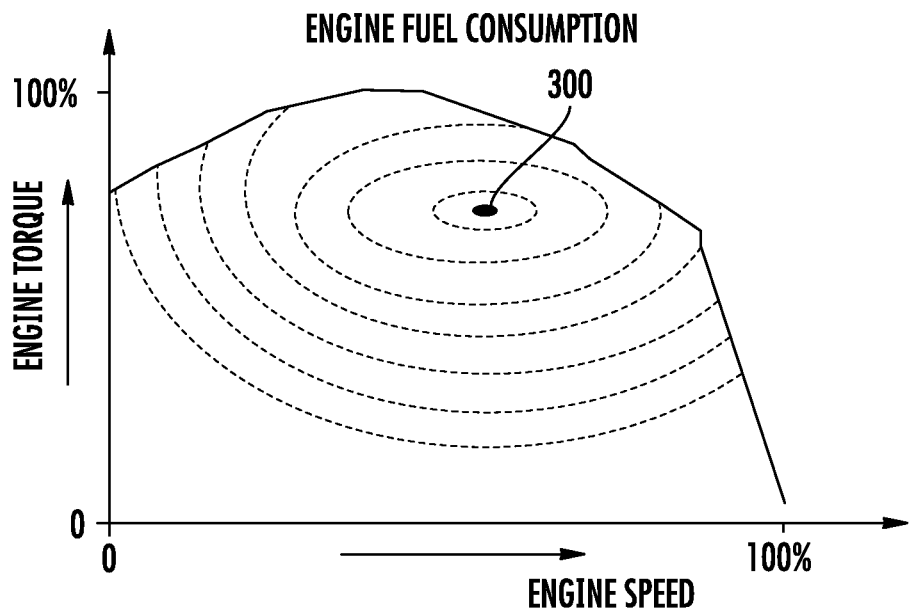
FIG. 4 illustrates a chart providing example efficiency data for the fuel consumption of an engine of a work vehicle in accordance with aspects of the present subject matter.

For example, FIG. 4 illustrates an example of a fuel consumption map for an engine (e.g., engine 22). As is generally understood, the fuel/power conversion efficiency or brake specific fuel consumption (BSFC) of an engine may vary at different engine settings (i.e., at different combinations of engine speed and engine torque). For instance, as shown in FIG. 4, each engine may have an optimal efficiency point 300 at which the fuel efficiency of the engine is maximized (i.e. at the minimum BFSC value). As such, by using the candidate engine speed for each candidate transmission/engine setting along with the engine torque requirement calculated for such candidate setting, a BSFC value may be defined for each candidate setting. The candidate setting with the lowest BFSC value (and, thus, the lowest fuel consumption) may then be identified as the target transmission/engine setting for achieving the desired ground speed.

It should be appreciated that, in several embodiments, suitable fuel efficiency data (e.g., in the form of fuel consumption maps, data tables, mathematical functions and/or the like) may be stored within the memory 132 of the controller 126 and may be utilized to determine the target transmission/engine setting based on the candidate engine speeds and associated torque power requirements for each candidate setting. For example, a look-up table may be stored within the controller's memory 132 that represents the fuel consumption map for the engine (e.g., similar to that shown in FIG. 4). In such an embodiment, for each candidate engine speed and associated engine torque, the controller 126 may reference the look-up table to identify the associated fuel consumption of each candidate setting.

Referring back to FIG. 3, at (212), the method 200 may include controlling the operation of the work vehicle such that a transmission ratio of the transmission and an engine speed of the engine correspond to the candidate gear ratio and the candidate engine speed, respectively, of the target transmission/engine setting. Specifically, upon the identifying the specific candidate transmission/engine setting having the lowest fuel consumption value, the controller 126 may be configured to control the operation of the engine 22 and the transmission 24 such that the gear ratio for the transmission 24 corresponds to the candidate gear ratio of the target setting and the engine speed corresponds to the candidate engine speed of the target setting.

It should be appreciated that the individual component parasitic power losses and, thus, the overall parasitic power loss value ($P_{loss}$) for each candidate setting may be determined by analyzing specific efficiency data associated with each relevant component of the work vehicle 10. As is generally understood, the efficiency data for each power-consuming component may be determined through experimentation, modeling and/or using any other suitable analysis technique and may be subsequently stored within the controller's memory 132. Additionally, the efficiency data, itself, may correspond to transfer functions, other mathematical formulas, tables, charts and/or any other suitable data that allows the controller 126 to determine the parasitic power loss associated with each component based on monitored and/or calculated operating parameters of the work vehicle 10. In this regard, it is noted that the efficiency data for a given power-consuming component is often available from the manufacturer of such component in the form of a look-up table, chart, transfer function, and/or the like.

In general, the various individual parasitic power losses noted above with reference to Equation 2 will be described below with reference to methodologies and/or strategies for determining such parasitic power losses based on known data associated with each individual power-consuming component (e.g., experimentally obtained efficiency data and/or efficiency data from the component's manufacturer) and/or monitored or calculated operating parameters of the work vehicle 10. However, given the knowledge of one of ordinary skill in the art with reference to component efficiencies and associated power losses, a detailed description of the calculation and/or determination of such parasitic power losses will not be provided below for the sake of brevity.

Engine Parasitic Power Losses ($PL_{engine}$)

In several embodiments, to determine the parasitic power losses for the engine 22 at each candidate transmission/engine setting, the consumed engine friction losses at each associated candidate gear ratio and engine speed may be estimated as a function of the current load on the engine 22. Typically, such engine friction loss data will be available as a look-up table or other efficiency/loss data from the manufacturer that correlates engine friction losses to the engine speed and the current load on the engine 22, with the engine friction losses generally decreasing with increases in the engine speed. Thus, in one embodiment, the efficiency/loss provided by the engine manufacturer may be stored within the controller's memory 132. As a result, by knowing the candidate engine speed for each candidate transmission/engine setting as well as by monitoring the current engine load, the controller 126 may estimate the engine's parasitic power losses for each candidate setting. Alternatively, the parasitic power losses for the engine 22 may be determined experimentally, such as by analyzing and compiling test stand data for the engine 22 to develop a mathematical function or look-up table that correlates engine speed and engine load to the engine's parasitic power losses.

Transmission Parasitic Power Losses ($PL_{trans}$)

In several embodiments, to determine the parasitic power losses for the transmission 24 at each candidate transmission/engine setting, the transmission power losses at each associated candidate gear ratio and engine speed may be estimated as a function of one or more operating parameters for the transmission 24. For example, such transmission loss data is typically available as a look-up table or other efficiency/loss data from the manufacturer that correlates transmission losses to the current gear ratio, transmission input speed, and the temperature of the hydraulic fluid within the transmission 24. Thus, in one embodiment, the efficiency/loss data provided by the transmission manufacturer may be stored within the controller's memory 132. As a result, by knowing the candidate gear ratio and engine speed for each candidate transmission/engine setting as well as by monitoring the temperature of the hydraulic fluid within the transmission 24, the controller 126 may estimate the transmission's parasitic power losses for each candidate setting. Alternatively, the parasitic power losses for the transmission 24 may be determined experimentally, such as by analyzing and compiling test stand data for the transmission 24 to develop a mathematical function or look-up table that correlates the gear ratio, transmission input speed, and the temperature of the hydraulic fluid within the transmission 24 to the associated parasitic power losses.

It should be appreciated that the manner in which the transmission's parasitic power losses are calculated may vary depending on the transmission configuration. For example, for a power shift transmission, the majority of the power losses may be associated with losses within the transmission's gearbox. In such an embodiment, the parasitic power losses may be determined primarily based on the efficiency of the gearbox.

Figure 5:
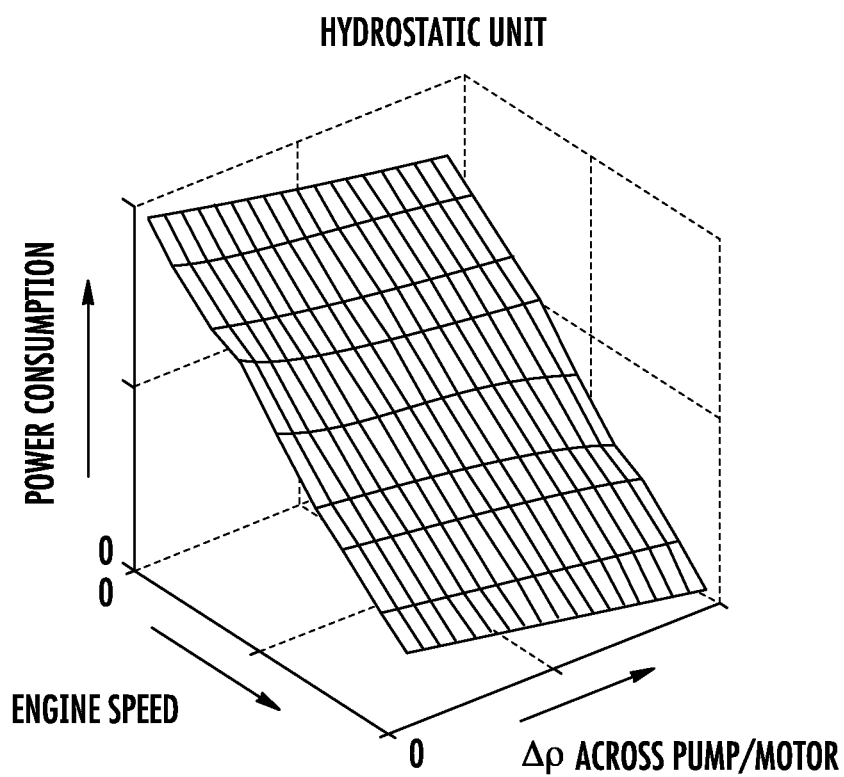
FIG. 5 illustrates a graph providing example efficiency data for the power consumption of a hydrostatic unit of a continuously variable transmission of a work vehicle in accordance with aspects of the present subject matter.
Figure 6:
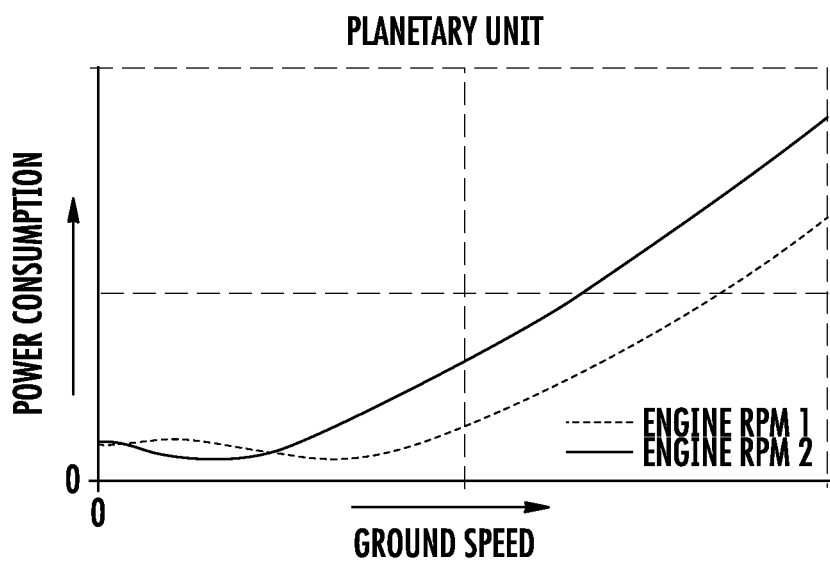
FIG. 6 illustrates a graph providing example efficiency data for the power consumption of a planetary unit of a continuously variable transmission of a work vehicle in accordance with aspects of the present subject matter.

However, for a continuously variable transmission, the power losses may be associated with the efficiencies of both the hydrostatic drive unit and the planetary gear unit of the transmission. In such an embodiment, the operating efficiency associated with each of the hydrostatic drive unit and the planetary gear unit may be considered to determine the parasitic power losses. For instance, FIGS. 5 and 6 illustrate example efficiency data for a continuously variable transmission. Specifically, FIG. 5 provides example efficiency data for a hydrostatic drive unit of a continuously variable transmission that relates the power consumption of the hydrostatic drive unit to the engine speed and the pressure differential across the pump/motor of the hydrostatic drive unit. As shown, the power consumption of the hydrostatic drive unit may be inversely related to the engine speed and the pressure differential, with the power consumption generally decreasing with increasing engine speeds and/or increasing pressure differentials. Similarly, FIG. 6 provides example efficiency data for a planetary gear unit of a continuously variable transmission that relates the power consumption of the planetary gear unit to the engine speed (only two example engine speeds being shown in FIG. 6) and the ground speed of the work vehicle 10. As shown, the power consumption of the planetary gear unit may vary significantly at lower ground speeds and may then steadily increase as the ground speeds become higher.

Fan Parasitic Power Losses ($PL_{fan}$)

In general, the parasitic power losses for the fan 112 will vary as a function of the fan speed, with the fan speed, in turn, being dependent primarily upon the operational parameters of the engine 22, namely the engine speed and engine torque. As indicated above, in several embodiments, the fan 112 may correspond to a vistronic fan that utilizes a viscous clutch 114 to control the fan speed. In such embodiments, the supply of fluid to the fan clutch 114 may be regulated to modulate the degree of engagement of the clutch 114, thereby increasing or decreasing the resulting fan speed. For example, as indicated above, the maximum fan speed may be achieved when the clutch 114 is fully engaged while lower fan speeds may be achieved by controlling the amount of slip across the clutch 114.

Figure 7:
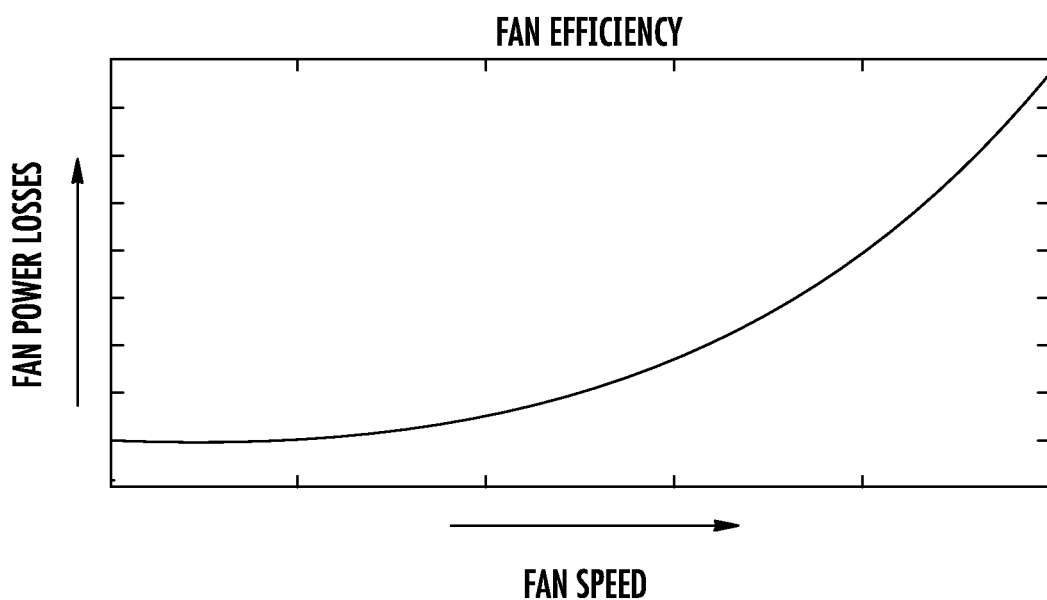
FIG. 7 illustrates a graph providing example efficiency data for the power consumption of a fan of a work vehicle in accordance with aspects of the present subject matter.

In several embodiments, to determine the parasitic power losses for the fan 112 at each candidate transmission/engine setting, an estimated fan speed may be calculated as a function of both the candidate engine speed and the engine torque requirement associated with such candidate setting. For example, in one embodiment, a look-up table may be stored within the controller's memory 132 that correlates fan speed to the candidate engine speed and the associated engine torque. As a result, by knowing the candidate engine speed for each candidate transmission/engine setting as well as by estimating the engine torque requirement associated with the candidate setting, an estimated fan speed may be determined by the controller 126. The controller 126 may then estimate the fan's parasitic power losses for each candidate setting based on the estimated fan speed. For instance, FIG. 7 provides example efficiency data for a vistronic fan that relates fan speed to the associated power losses. As shown, the fan power losses are generally a non-linear function of the estimated fan speed, with the power losses generally increasing with increases in the fan speed.

It should be appreciated that, in one embodiment, the efficiency data used to determine the fan power losses may derive from the fan manufacturer. Alternatively, the efficiency data may be determined experimentally, such as by analyzing and/or compiling test stand data or any other suitable data that provides an indication of the power losses of the fan 112 as a function of fan speed.

It should also be appreciated that, as indicated above, the final engine torque requirement for each candidate transmission/engine setting may be calculated as a function of the candidate engine speed and the net engine power taking into account the various parasitic power losses. Since the parasitic power losses of the fan may, in several embodiments, be considered when calculating the overall parasitic power loss for each candidate setting (e.g., per Equation 2), the controller 126 may be configured to determine an initial engine torque requirement for each candidate transmission/engine setting when estimating the fan speed that does not take into account for fan's parasitic power losses. For instance, in one embodiment, the engine torque value used to estimate the fan speed may correspond to an initial engine torque estimate determined as a function of the associated candidate engine speed (e.g., via a look-up table stored within the controller's memory 132). Alternatively, the overall parasitic power loss may be initially calculated without considering fan power losses (e.g., by removing the fan power loss input from Equation 2). This initial parasitic power loss value may then be used to calculate the net engine power, which may, in turn, be used to determine an initial engine torque value for estimating the fan speed. Once the parasitic power loss for the fan is determined based on the estimated fan speed, an updated engine torque value may then be calculated for the candidate setting that takes into the account the fan power losses.

Figure 8:
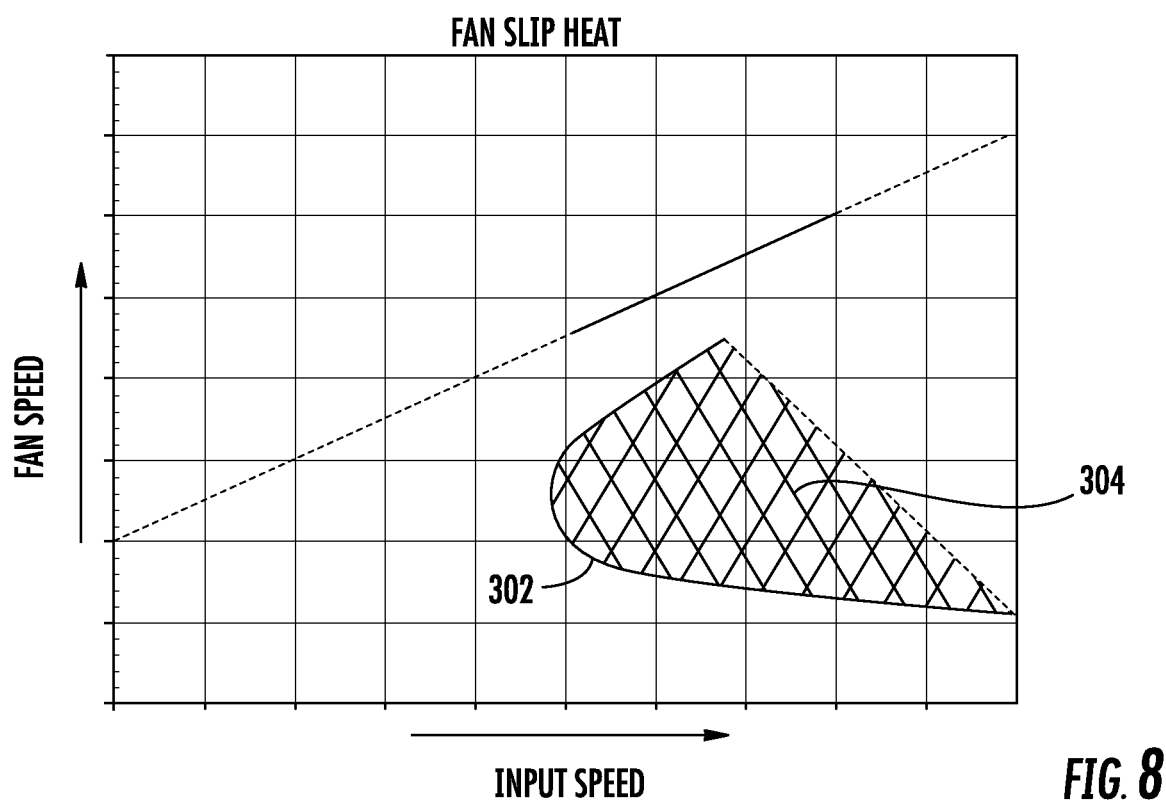
FIG. 8 illustrates a graph providing an example slip heat limit curve for a fan of a work vehicle in accordance with aspects of the present subject matter.

Additionally, it should be appreciated that, while the engine's operating settings may be used primarily to estimate the fan speed, various other factors may also affect the desired fan speed, including, but not limited to, the fluid temperature supplied to the fan clutch 114, the intake manifold temperature, the engine coolant temperature, the refrigerant pressure, and/or the like. In addition, for vistronic fans, the slip heat capacity for the fan clutch 114 may also impact the desired or achievable fan speed. For instance, FIG. 8 illustrates an example plot illustrating a slip heat limit curve (indicated by line 302) charted as a function of the fan speed and the input speed to the fan 112 (which is directly related to the engine speed). As shown, the slip heat limit curve 302 defines a threshold at which the fan 112 may be subject to overheating for fan/input speed combinations defined to the right of the curve 302 (e.g., fan/input speed combinations within the cross-hatched area 304). Specifically, operation of the fan 112 within the cross-hatched area 304 may be limited to a very short period of time to prevent overheating. Thus, given the input speed to the fan 112, the fan speed must generally be maintained outside the cross-hatched area 304 (e.g., except when the cross-hatched area 304 is being briefly traversed to increase the fan speed to a speed defined above the slip heat limit curve 302).

Alternator Parasitic Power Losses (PL$_{alt}$)

In several embodiments, to determine the parasitic power losses for the alternator 108 at each candidate transmission/engine setting, the power losses may be estimated for each candidate engine speed as a function of one or more operating parameters for the alternator 108. Specifically, the alternator electrical power may generally be determined as a function of both the current and the voltage for the alternator 108. For instance, the alternator electrical power may be expressed according to the following equation (Equation 5):

$$P_{alt(e)} = I * V \quad (5)$$

wherein, P$_{alt(e)}$ corresponds to the alternator electrical power, I corresponds to the alternator current, and V corresponds to the alternator voltage.

Thus, by monitoring the broadcasted or sensed alternator current and voltage, the controller 1266 may be configured to determine the alternator electrical power, which may then be used to calculate the corresponding mechanical engine power required to generate such electrical power (i.e., the alternator power loss). For instance, in one embodiment, the parasitic power loss for the alternator 108 may be expressed according to the following equation (Equation 6):

$$PL_{alt} = \frac{P_{alt(e)}}{\eta(\omega, I)} \quad (6)$$

wherein, PL$_{alt}$ corresponds to the parasitic power loss for the alternator 108, P$_{alt(e)}$ corresponds to the alternator electrical power, and η(ω,I) corresponds to the alternator efficiency as a function of the engine speed and the alternator current.

Figure 9:
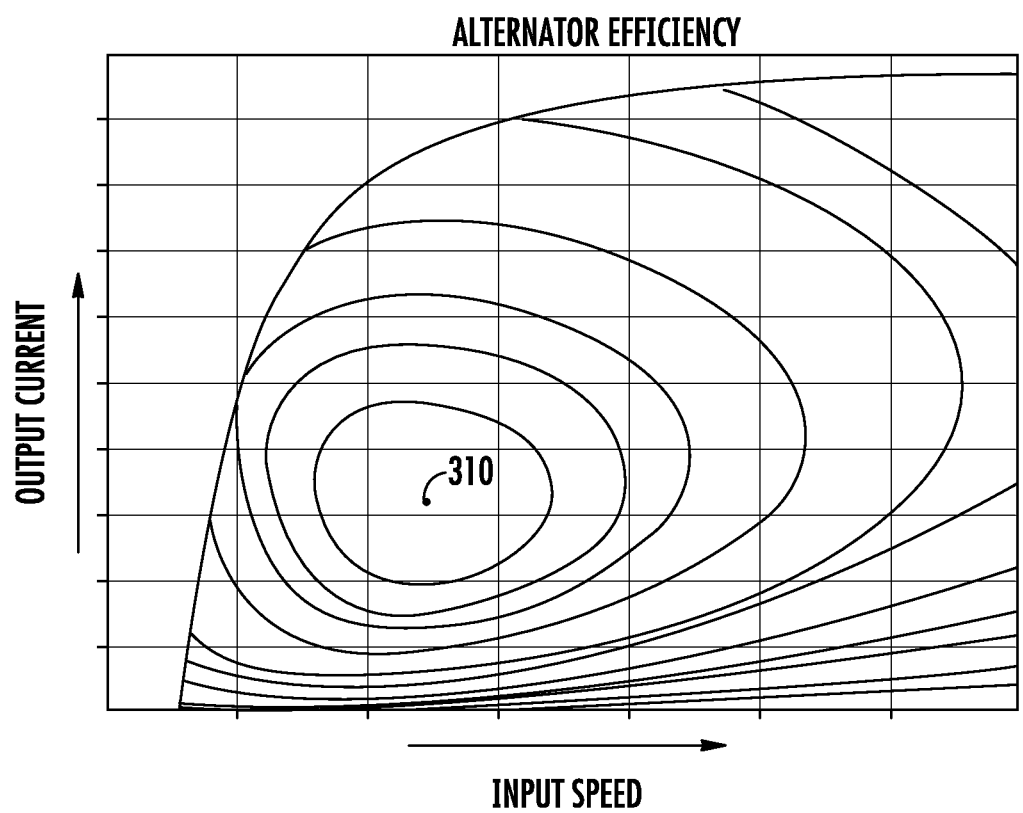
FIG. 9 illustrates a graph providing example efficiency data for an alternator of a work vehicle in accordance with aspects of the present subject matter.

As noted above, the efficiency of the alternator 108 may generally vary as a function of the engine speed. Thus, for differing candidate engine speeds, it can be expected that the alternator efficiency will vary. For example, FIG. 9 illustrates an example of an alternator efficiency plot as a function of both the alternator current output and the alternator input speed (which is directly related to the engine speed). As shown in FIG. 9, the alternator 108 may have an optimal efficiency point 310 at which the alternator efficiency is maximized, with bands of decreased efficiency being defined around the optimal efficiency point 310. By referencing such efficiency data, the controller 126 may determine the alternator efficiency as a function of each candidate engine speed and the associated alternator output current. The alternator power loss may then be calculated using Equation 6.

It should be appreciated that, in one embodiment, the efficiency data used to determine the alternator power losses may derive from the alternator manufacturer. Alternatively, the efficiency data may be determined experimentally, such as by analyzing and/or compiling test stand data or any other suitable data that provides an indication of the power losses of the alternator 108 as a function of the engine speed.

Tire-Related Parasitic Power Losses (PL$_{tire}$)

In several embodiments, to determine the tire-related parasitic power losses at each candidate transmission/engine setting, the consumed tire power at each associated candidate gear ratio and engine speed may be estimated as a function of the estimated or measured tire slippage. Specifically, the consumed tire power will generally increase with increases in the amount of tire slippage. Thus, by estimating or detecting tire slippage for each candidate setting, the controller 126 may estimate the associated tire-related parasitic power losses. In this regard, experimental data associated with amount of tire slippage may be collected for a plurality of different ratio/speed combinations to develop a mathematical function or look-up table that correlates tire slippage to various transmission/engine settings. In doing so, the amount of tire slippage may be determined, for example, as a function of the differential between the target ground speed for the work vehicle 10 and the measured or actual ground speed of the work vehicle 10. Accordingly, when collecting the experimental data, the actual ground speed of the work vehicle may be monitored and compared to the target or requested ground speed. The speed differential between the actual and target ground speed may then be correlated to the amount of tire slippage.

Power-Take-Off Parasitic Power Losses (PL$_{PTO}$)

Figure 10:
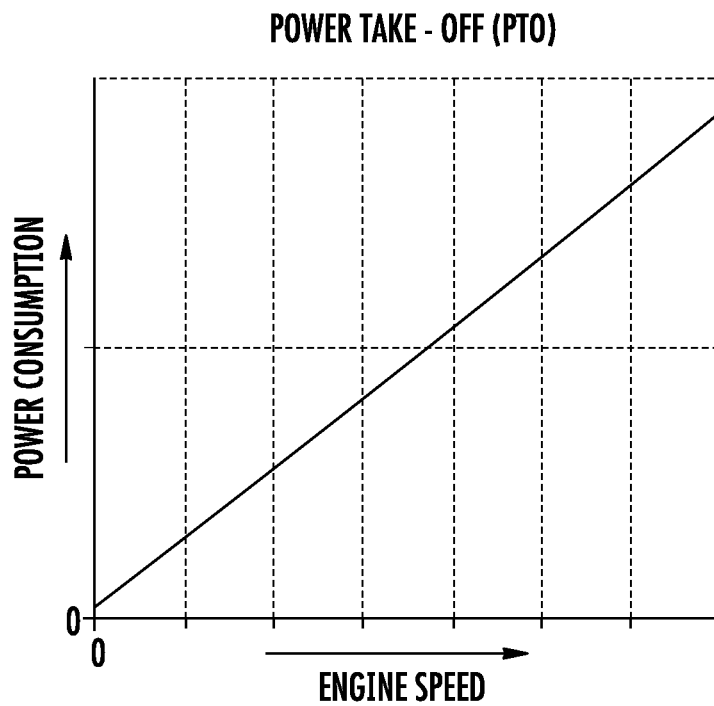
FIG. 10 illustrates a graph providing example efficiency data for the power consumption of a power take-off of a work vehicle in accordance with aspects of the present subject matter.

In several embodiments, to determine the parasitic power losses for the PTO(s) 116, 118 at each candidate transmission/engine setting, the consumed PTO power may generally be determined as a function of the engine speed. For example, FIG. 10 provides example efficiency data for each PTO 116, 118 that relates its power consumption to the engine speed. As shown, the power consumption of each PTO 116, 118 may generally vary linearly with changes in the engine speed. Thus, for each candidate engine speed, the controller 126 may determine the associated parasitic power loss for each PTO 116, 118.

Other Parasitic Power Losses (PL$_{other}$)

Figure 11:
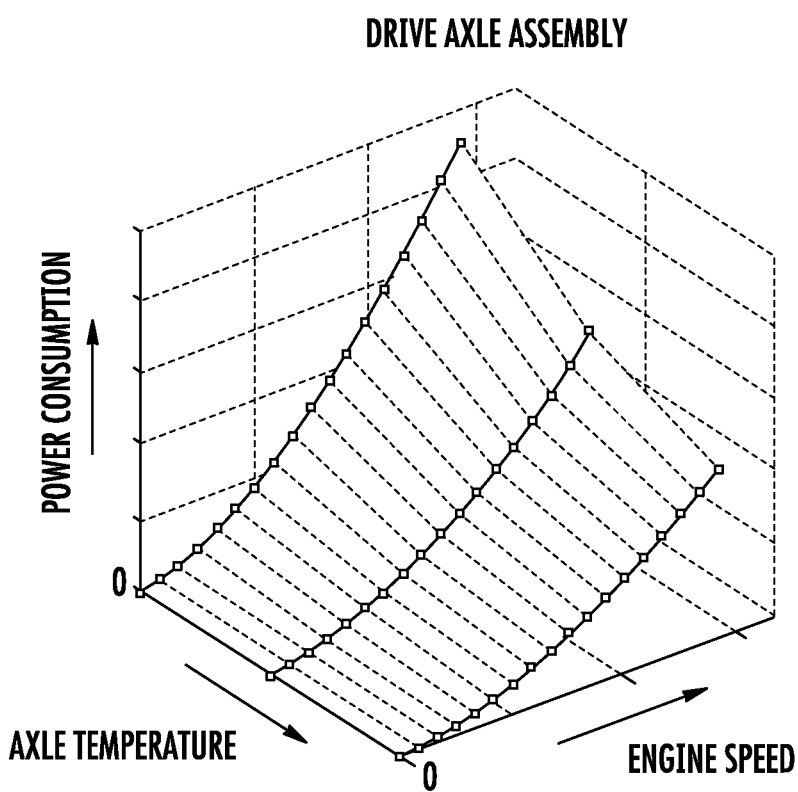
FIG. 11 illustrates a graph providing example efficiency data for the power consumption of a drive axle assembly of a work vehicle in accordance with aspects of the present subject matter.

It should be appreciated that, in addition to the individual components noted above, the work vehicle 10 may include various other power-consuming components that contribute to the total parasitic power loss for the vehicle 10. For instance, the drive axle assembly 26 of the work vehicle 10 may consume engine power in an amount that varies as a function of the engine speed. Specifically, FIG. 11 illustrates example efficiency data for a drive axle assembly that relates its power consumption to both the engine speed and the axle temperature. As shown, the power consumption of the drive axle assembly may generally increase with increasing engine speeds and/or decreasing axle temperatures. Similarly, other power-consuming components, such as the hydraulic sub-systems, the air conditioning compressor, and/or the like, may also be considered when determined the overall parasitic power loss for the work vehicle 10.

Figure 12:
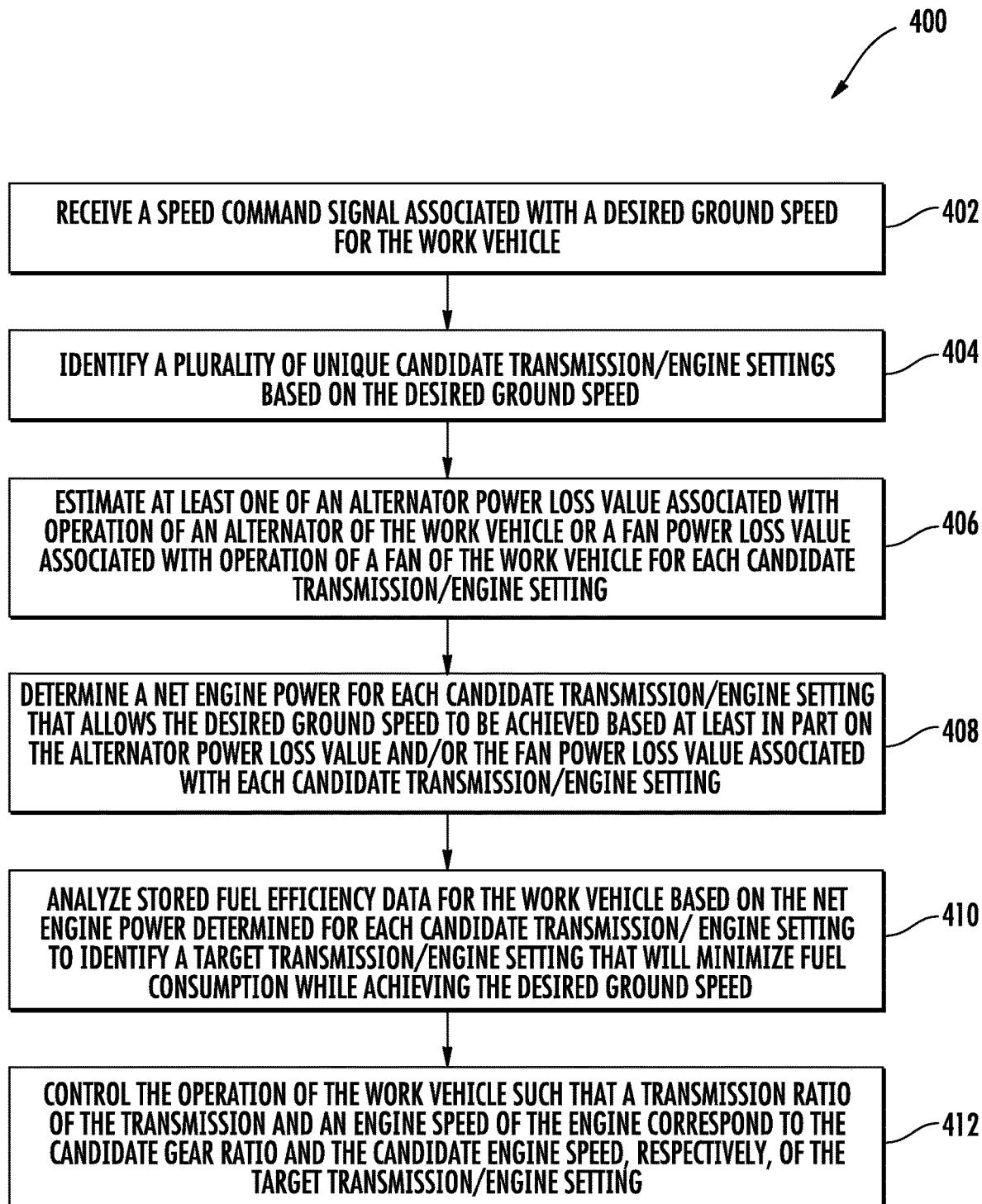
FIG. 12 illustrates a flow diagram of another embodiment of a method for reducing the fuel consumption of a work vehicle in accordance with aspects of the present subject matter.

Referring now to FIG. 12, a flow diagram of another embodiment of a method 400 for reducing the fuel consumption of a work vehicle 10 is illustrated in accordance with aspects of the present subject matter. The method 400 will generally be described herein with reference to the work vehicle 10 shown in FIG. 1 and the system 100 shown in FIG. 2. However, it should be appreciated by those of ordinary skill in the art that the disclosed method 400 may be implemented with any other suitable vehicle having any other suitable vehicle configuration and/or within any other suitable system having any other suitable system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As indicated above, when determining the parasitic power loss value associated with each candidate transmission/engine setting, the individual power losses of all or a subset of the various power-consuming components may be considered. For instance, the method 400 of FIG. 12 will generally be described with reference to using the alternator-based power losses and/or the fan-based power losses, either alone or in combination with the parasitic power losses for one or more of the other power-consuming components, to estimate the overall parasitic power loss value associated with each candidate transmission/engine setting. Based on the overall parasitic power loss determined for each transmission/engine setting, a net engine power or torque requirement can be calculated and used as an input for determining the fuel efficiency of the work vehicle at each candidate setting. The gear ratio and corresponding engine speed of the candidate setting associated with the lowest fuel consumption may then be set as the target or desired transmission/engine setting for maintaining the work vehicle at the desired ground speed.

As shown in FIG. 12, at (402), the method 400 may include receiving a speed command signal associated with a desired ground speed for the work vehicle. For instance, as indicated above, the work vehicle 10 may include one or more input devices 134 for allowing the operator to command or request a desired ground speed. Additionally, in one embodiment, the controller 126 may be configured to receive the speed command signal in connection with a request to operate the work vehicle 10 within its auto-efficiency mode. In such an embodiment, the controller 126 may be configured to initially select the closest gear ratio that allows for the operator-requested ground speed to be achieved given any applicable engine speed limits. Based on the initially selected gear ratio and associated engine speed, the controller 126 may then control the operation of the engine 22 and/or the transmission 24, as necessary, to adjust the vehicle's speed to the desired ground speed. Thereafter, the controller 126 may execute the remainder of the disclosed method 400 to minimize the vehicle's fuel consumption while ensuring that the work vehicle 10 is maintained at the desired ground speed.

Additionally, at (404), the method 400 may include identifying a plurality of unique candidate transmission/engine settings based on the desired ground speed associated with the received speed command signal. Specifically, in several embodiments, each candidate transmission/engine setting identified by the controller 126 may include a candidate gear ratio and a corresponding candidate engine speed at which the desired ground speed may be achieved. Thus, for a given ground speed, a plurality of different combinations or pairs of gear ratios and associated engine speeds may be available for selection by the controller 126 (e.g., as shown in the table above).

Moreover, at (406), the method 400 may include estimating at least one of an alternator power loss value associated with operation of an alternator of the work vehicle or a fan power loss value associated with operation of a fan of the work vehicle for each candidate transmission/engine setting. For instance, as indicated above, the controller 126 may be configured to estimate the alternator-based parasitic power losses as a function of the candidate engine speed associated with each candidate setting. Similarly, as indicated above, the controller 126 may be configured to estimate the fan-based parasitic power losses as a function of both the candidate engine speed associated with each candidate setting and an associated estimated torque value for such candidate setting.

In one embodiment, the parasitic power loss associated with each candidate transmission/engine setting may be determined based solely on either the alternator-based power losses or the fan-based power losses, or the parasitic power loss may be defined based on the combination or summation of the alternator-based power losses and the fan-based power losses. In another embodiment, the parasitic power loss associated with each candidate transmission/engine setting may be determined based on the combination or summation of the alternator-based power losses and one or more individual power losses for one or more other power-consuming components (e.g., transmission-based losses, tire-based losses, and/or the like). In a further embodiment, the parasitic power loss associated with each candidate transmission/engine setting may be determined based on the combination or summation of the fan-based power losses and one or more individual power losses for one or more other power-consuming components (e.g., transmission-based losses, tire-based losses, and/or the like).

Referring still to FIG. 12, at (408), the method 400 includes determining a net engine power for each candidate transmission/engine setting that allows the desired ground speed to be achieved based at least in part on the alternator power loss value and/or the fan power loss value associated with each candidate transmission/engine setting. Specifically, in several embodiments, the controller 126 may be configured to calculate the net engine power available for achieving the requested ground speed at each candidate transmission/engine setting as a function of the alternator-based power losses and/or the fan-based power losses (e.g., using Equation 3 above). Additionally, as indicated above, the individual power losses associated with one or more other power-consuming components of the work vehicle may also be considered when determining the net engine power. In such an embodiment, the net engine power for each candidate transmission/engine setting may also be determined as a function of such additional power loss values.

Additionally, at (410), the method 400 may include analyzing stored fuel efficiency data for the work vehicle based on the net engine power determined for each candidate transmission/engine setting to identify a target transmission/engine setting of the various candidate transmission/engine settings that will minimize fuel consumption while achieving the desired ground speed. Specifically, in several embodiments, based on the net engine power, the controller 126 may be configured to determine the associated engine torque requirement for achieving the desired ground speed at the ratio/engine pair associated with each candidate transmission/engine setting. Thereafter, by referencing the engine torque requirement determined for each candidate transmission/engine setting along with the candidate engine speed associated with such candidate setting, the controller 126 may be configured to determine the most fuel efficient candidate setting for achieving the ground speed requested by the operator.

Moreover, at (412), the method 400 may include controlling the operation of the work vehicle such that a transmission ratio of the transmission and an engine speed of the engine correspond to the candidate gear ratio and the candidate engine speed, respectively, of the target transmission/engine setting. Specifically, upon the identifying the specific candidate transmission/engine setting having the lowest fuel consumption value, the controller 126 may be configured to control the operation of the engine 22 and the transmission 24 such that the gear ratio for the transmission 24 corresponds to the candidate gear ratio of the target setting and the engine speed corresponds to the candidate engine speed of the target setting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing the fuel consumption of a work vehicle having an engine and a transmission coupled to the engine, the method comprising:
   receiving, with one or more computing devices, a speed command signal associated with a desired ground speed for the work vehicle;
   identifying, with the one or more computing devices, a plurality of unique candidate transmission/engine settings based on the desired ground speed, each candidate transmission/engine setting including a candidate gear ratio and a corresponding candidate engine speed for achieving the desired ground speed;
   estimating, with the one or more computing devices, at least one of an alternator power loss value associated with operation of an alternator of the work vehicle at each candidate transmission/engine setting or a fan power loss value associated with operation of a fan of the work vehicle at each candidate transmission/engine setting, wherein estimating at least one of the alternator power loss value or the fan power loss value comprises estimating the alternator power loss value associated with each candidate transmission/engine setting, the alternator power loss value being estimated by:
      determining an electrical power output of the alternator for each candidate transmission/engine setting; and
      determining the alternator power loss value as a function of the electrical power output and an alternator operating efficiency associated with each candidate transmission/engine setting;
   determining, with the one or more computing devices, a net engine power for each candidate transmission/engine setting that allows the desired ground speed to be achieved based at least in part on the at least one of the alternator power loss value or the fan power loss value associated with each candidate transmission/engine setting;
   analyzing, with the one or more computing devices, stored fuel efficiency data for the work vehicle based on the net engine power determined for each candidate transmission/engine setting to identify a target transmission/engine setting of the plurality of candidate transmission/engine settings that will minimize fuel consumption while achieving the desired ground speed; and
   controlling, with the one or more computing devices, the operation of the work vehicle such that a transmission ratio of the transmission and an engine speed of the engine correspond to the candidate gear ratio and the candidate engine speed, respectively, of the target transmission/engine setting.

2. The method of claim 1, further comprising determining the alternator operating efficiency as a function of the candidate engine speed associated with each candidate transmission/engine setting.

3. A method for reducing the fuel consumption of a work vehicle having an engine and a transmission coupled to the engine, the method comprising:
   receiving, with one or more computing devices, a speed command signal associated with a desired ground speed for the work vehicle;
   identifying, with the one or more computing devices, a plurality of unique candidate transmission/engine settings based on the desired ground speed, each candidate transmission/engine setting including a candidate gear ratio and a corresponding candidate engine speed for achieving the desired ground speed;
   estimating, with the one or more computing devices, at least one of an alternator power loss value associated with operation of an alternator of the work vehicle at each candidate transmission/engine setting or a fan power loss value associated with operation of a fan of the work vehicle at each candidate transmission/engine setting, wherein estimating at least one of the alternator power loss value or the fan power loss value comprises estimating the fan power loss value associated with each candidate transmission/engine setting, the fan power loss value being estimated by:
      determining an estimated fan speed for the fan as a function of the candidate engine speed associated with each candidate transmission/engine setting and a corresponding engine torque requirement for each candidate transmission/engine setting; and
      determining the fan power loss value as a function of the estimated fan speed;
   determining, with the one or more computing devices, a net engine power for each candidate transmission/engine setting that allows the desired ground speed to be achieved based at least in part on the at least one of the alternator power loss value or the fan power loss value associated with each candidate transmission/engine setting;
   analyzing, with the one or more computing devices, stored fuel efficiency data for the work vehicle based on the net engine power determined for each candidate transmission/engine setting to identify a target transmission/engine setting of the plurality of candidate transmission/engine settings that will minimize fuel consumption while achieving the desired ground speed; and
   controlling, with the one or more computing devices, the operation of the work vehicle such that a transmission ratio of the transmission and an engine speed of the engine correspond to the candidate gear ratio and the candidate engine speed, respectively, of the target transmission/engine setting.

4. The method of claim 3, further comprising:
   estimating the corresponding engine torque requirement for each candidate transmission/engine setting without taking into account the fan power loss value; and
   upon determining the fan power loss value based on the estimated fan speed, calculating an updated engine torque requirement for each candidate transmission/engine setting that takes into account the fan power loss value.

5. The method of claim 1, wherein receiving the speed command signal comprises receiving the speed command signal in association with a request to execute an operating mode in which a ground speed for the work vehicle is maintained at the desired ground speed.

6. The method of claim 1, further comprising determining a parasitic power loss value for each associated candidate transmission/engine setting as a function of the at least one of the alternator power loss value or the fan power loss value and an individual power loss value of one or more additional power-consuming components of the work vehicle, the net engine power being determined based on the parasitic power loss value for each associated candidate transmission/engine setting.

7. The method of claim 6, wherein the one or more additional power-consuming components comprise at least one of the engine, the transmission, a power-take off, a drive axle assembly, or tires of the work vehicle.

8. The method of claim 1, further comprising:
upon receipt of the speed command signal, selecting a closest gear ratio at which the desired ground speed can be achieved via operation of the engine at a corresponding engine speed; and
controlling the operation of the work vehicle such that an initial transmission ratio of the transmission and an initial engine speed of the engine correspond to the closest gear ratio and the corresponding engine speed, respectively.

9. The method of claim 8, further comprising receiving an input associated with a requested engine speed range for the engine;
wherein selecting the closest gear ratio comprises selecting the closest gear ratio at which the corresponding engine speed falls within the requested engine speed range.

10. The method of claim 8, wherein controlling the operation of the work vehicle such that the transmission ratio and the engine speed correspond to the candidate gear ratio and the candidate engine speed, respectively, of the target transmission/engine setting comprises adjusting the transmission ratio from the initial transmission ratio to the candidate gear ratio of the target transmission/engine setting and adjusting the engine speed from the initial engine speed to the candidate engine speed of the target transmission/engine setting upon identifying the target transmission/engine setting.

11. The method of claim 1, further comprising determining an engine torque requirement for each candidate transmission/engine setting that allows the desired ground speed to be achieved as a function of the candidate engine speed and the net engine power for each candidate transmission/engine setting.

12. The method of claim 11, wherein analyzing the stored fuel efficiency data for the work vehicle comprises analyzing the stored fuel efficiency data for the work vehicle based on the engine torque requirement determined for each candidate transmission/engine setting to identify the target transmission/engine setting.

13. The method of claim 1, wherein analyzing the stored fuel efficiency data for the work vehicle comprises analyzing the stored fuel efficiency data for the work vehicle to identify a fuel consumption value for each candidate transmission/engine setting.

14. A system for reducing the fuel consumption of a work vehicle, the system comprising:
an engine;
a transmission operatively coupled to the engine; and a controller configured to control an operation of the engine and the transmission, the controller including a processor and associated memory, the memory storing instructions that, when executed by the processor, configure the controller to:
receive a speed command signal associated with a desired ground speed for the work vehicle;
identify a plurality of unique candidate transmission/engine settings based on the desired ground speed, each candidate transmission/engine setting including a candidate gear ratio and a corresponding candidate engine speed for achieving the desired ground speed;
estimate at least one of an alternator power loss value associated with operation of an alternator of the work vehicle at each candidate transmission/engine setting or a fan power loss value associated with operation of a fan of the work vehicle at each candidate transmission/engine setting;
determine an electrical power output of the alternator for each candidate transmission/engine setting, the alternator power loss value being determined as a function of the electrical power output and an alternator operating efficiency associated with each candidate transmission/engine setting;
determine a net engine power for each candidate transmission/engine setting that allows the desired ground speed to be achieved based at least in part on the at least one of the alternator power loss value or the fan power loss value associated with each candidate transmission/engine setting;
analyze stored fuel efficiency data for the work vehicle based on the net engine power determined for each candidate transmission/engine setting to identify a target transmission/engine setting of the plurality of candidate transmission/engine settings that will minimize fuel consumption while achieving the desired ground speed; and
control the operation of the work vehicle such that a transmission ratio of the transmission and an engine speed of the engine correspond to the candidate gear ratio and the candidate engine speed, respectively, of the target transmission/engine setting.

15. The system of claim 14, wherein the controller is configured to determine an estimated fan speed for the fan as a function of the candidate engine speed associated with each candidate transmission/engine setting and a corresponding engine torque requirement for each candidate transmission/engine setting, the fan power loss value being determined as a function of the estimated fan speed.

16. The system of claim 14, wherein, upon receipt of the speed command signal, the controller is configured to select a closest gear ratio at which the desired ground speed can be achieved via operation of the engine at a corresponding engine speed, the controller being further configured to control the operation of the work vehicle such that an initial transmission ratio of the transmission and an initial engine speed of the engine correspond to the closest gear ratio and the corresponding engine speed, respectively.

17. The system of claim 16, wherein, upon identifying the target transmission/engine setting, the controller is configured to adjust the transmission ratio from the initial transmission ratio to the candidate gear ratio of the target transmission/engine setting and adjust the engine speed from the initial engine speed to the candidate engine speed of the target transmission/engine setting.

18. The system of claim 14, wherein the controller is further configured to determine an engine torque requirement for each candidate transmission/engine setting that allows the desired ground speed to be achieved as a function of the candidate engine speed and the net engine power for each candidate transmission/engine setting, the controller configured to analyze the stored fuel efficiency data for the work vehicle based on the engine torque requirement determined for each candidate transmission/engine setting to identify the target transmission/engine setting.

* * * * *